(12) United States Patent  
Petersen et al.

(10) Patent No.: US 8,224,007 B2
(45) Date of Patent: Jul. 17, 2012

(54) HEARING AID WITH RECHARGEABLE BATTERY AND RECHARGEABLE BATTERY

(75) Inventors: Anders Erik Petersen, Smørum (DK); Frank Engel Rasmussen, Smørum (DK); Henning Knak Poulsen, Smørum (DK); Gunnar Gudnason, Smørum (DK)

(73) Assignee: Oticon A/S, Smorum (DK)

( * ) Notice: Subject to any disclaimer, the term of this patent is extended or adjusted under 35 U.S.C. 154(b) by 1336 days.

(21) Appl. No.: 11/795,575

(22) PCT Filed: Jan. 12, 2006

(86) PCT No.: PCT/EP2006/050168
§ 371 (c)(1),
(2), (4) Date: Jul. 19, 2007

(87) PCT Pub. No.: WO2006/077192
PCT Pub. Date: Jul. 27, 2006

(65) Prior Publication Data
US 2008/0137890 A1    Jun. 12, 2008

(30) Foreign Application Priority Data

Jan. 20, 2005 (DK) ................................ 2005 00105

(51) Int. Cl.
*H04R 25/00* (2006.01)
(52) U.S. Cl. ...................................................... 381/323
(58) Field of Classification Search ............... 84/322, 84/323
See application file for complete search history.

(56) References Cited

U.S. PATENT DOCUMENTS

| | | | |
|---|---|---|---|
| 5,314,765 A | 5/1994 | Bates | |
| 5,338,625 A | 8/1994 | Bates et al. | |
| 5,455,126 A | 10/1995 | Bates et al. | |
| 5,512,147 A | 4/1996 | Bates et al. | |
| 5,561,004 A | 10/1996 | Bates et al. | |
| 5,567,210 A | 10/1996 | Bates et al. | |
| 5,569,520 A | 10/1996 | Bates | |
| 5,597,660 A | 1/1997 | Bates et al. | |
| 5,612,152 A | 3/1997 | Bates | |
| 6,040,680 A | 3/2000 | Toya et al. | |
| 6,265,100 B1 | 7/2001 | Saaski et al. | |
| 6,310,960 B1 * | 10/2001 | Saaski et al. | 381/323 |
| 6,344,366 B1 | 2/2002 | Bates | |
| 6,420,065 B1 | 7/2002 | Yde-Andersen et al. | |
| 6,555,270 B2 | 4/2003 | Bates | |
| 6,562,518 B2 | 5/2003 | Bates | |
| 6,818,356 B1 | 11/2004 | Bates | |
| 2001/0014423 A1 | 8/2001 | Bates | |
| 2003/0064292 A1 | 4/2003 | Neudecker et al. | |

FOREIGN PATENT DOCUMENTS

| | | |
|---|---|---|
| EP | 1 100 139 A | 5/2001 |
| FR | 2 755 795 A | 5/1998 |
| JP | 8088019 A | 4/1996 |
| JP | 9007629 A | 1/1997 |

* cited by examiner

*Primary Examiner* — Elvin G Enad
*Assistant Examiner* — Andrew R Millikin
(74) *Attorney, Agent, or Firm* — Birch, Stewart, Kolasch & Birch, LLP

(57) ABSTRACT

A rechargeable battery is provided comprising a flexible elongate electron conductive core surrounded by a first electrochemically active layer, and a second electrochemically active layer, separated by a separation layer and where an electron conducting element contacts the outer surface of the second electrochemically active layer, whereby at least one of the two electrochemically active layers and the separation layer are comprised of thin-film layers. Further a hearing aid is provided wherein a battery comprising thin film layers is provided. Such a battery may be curled or wound to accommodate an irregular space inside the hearing aid.

14 Claims, 4 Drawing Sheets

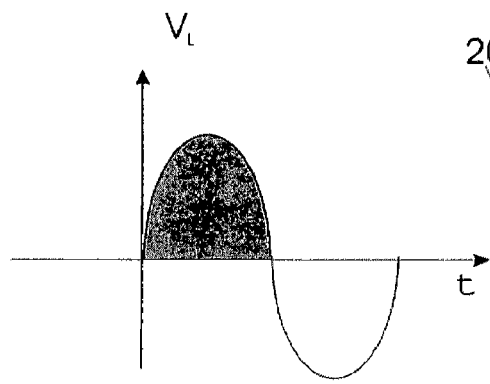
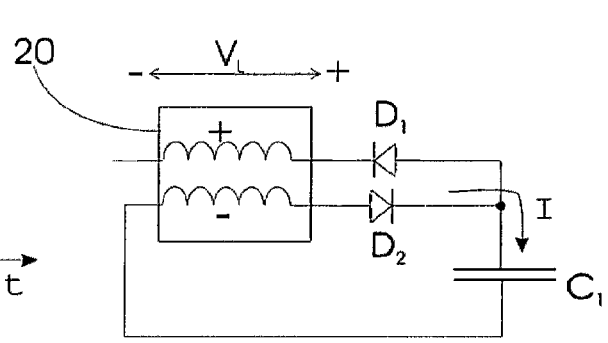
Fig. 4a            Fig. 4b
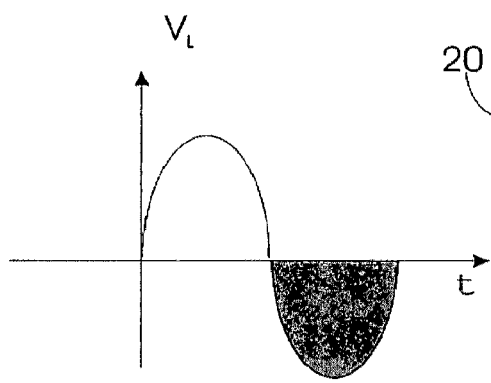
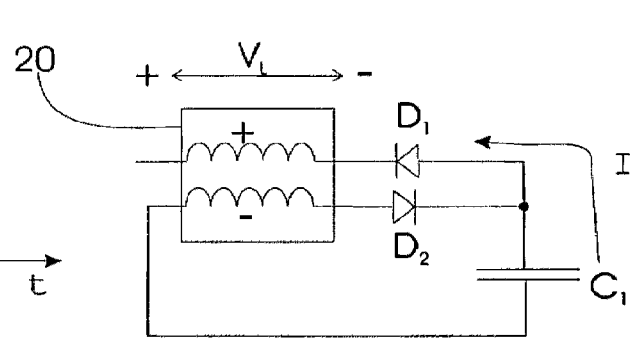
Fig. 5a            Fig. 5b

HEARING AID WITH RECHARGEABLE BATTERY AND RECHARGEABLE BATTERY

AREA OF THE INVENTION

The invention concerns a rechargeable battery and hearing aid with a rechargeable battery.

BACKGROUND OF THE INVENTION

In hearing aids the power supply is a critical factor and a very large portion of modern hearing aids is occupied by the battery. Decreasing the battery size then allows the overall size of the hearing aid to be decreased. Further, longer battery life is desired especially when it comes to rechargeable batteries. With traditional rechargeable battery technology, it is not possible to obtain a solution which combines sufficient battery capacity and a generic battery size which fits into any hearing aid regardless of its shape and size. This is primarily caused by the huge diversity of shapes and sizes of the hearing aids (especially ITE types) and by the lack of true flexibility of the batteries which are currently available. Further in modern hearing aids a number of wireless applications are requested. This is not only wireless recharge of the battery but also different wireless communication possibilities, such as telecoil, FM antenna and digitally working induction antennas as well as wireless transmission of charging power for rechargeable batteries. So far it has proved very difficult to realise these functions in the very limited space inside a hearing aid. The invention provides a battery which may be fitted into any hearing aid regardless of style, and which also may allow additional functions to be performed with the battery apart from storage of power.

From the prior art in the field of rechargeable batteries the following should be mentioned:

Bates, U.S. Pat. No. 6,818,356: "Thin film battery and electrolyte therefore" This document describes a solid amorphous electrolyte composition for a thin-film battery.

J. B. Bates, U.S. Pat. No. 5,314,765 (May 24, 1994): "Protective Lithium Ion Conducting Ceramic Coating for Lithium Metal Anodes and Associate Method", in this document a battery structure is disclosed including a cathode, a lithium metal anode and an electrolyte disposed between the lithium anode and the cathode utilizes a thin-film layer of lithium phosphorus oxynitride overlying so as to coat the lithium anode and thereby separate the lithium anode from the electrolyte.

J. B. Bates U.S. Pat. No. 5,612,152 (Mar. 18, 1997): "Rechargeable Lithium Battery for Use in Applications Requiring a Low to High Power Output", This patent discloses a rechargeable lithium battery which employs characteristics of thin-film batteries and can be used to satisfy power requirements within a relatively broad range.

J. B. Bates, N. J. Dudney, G. R. Gruzalski, and C. F. Luck, U.S. Pat. No. 5,338,625 (Aug. 16, 1994): "Thin-Film Battery and Method for Making Same", This document describes a thin-film battery, especially a thin-film microbattery, and a method for making same having application as a backup or primary integrated power source for electronic devices.

J. B. Bates, N. J. Dudney, G. R. Gruzalski, and C. F. Luck, U.S. Pat. No. 5,455,126 (Oct. 3, 1995): "Electro-Optical Device Including a Nitrogen Containing Electrolyte", In this publication a thin-film battery is described.

J. B. Bates and N. J. Dudney, U.S. Pat. No. 5,512,147 (Apr. 30, 1996): "Method for Making an Electrolyte for an Electrochemical Cell". This document describes a thin-film battery, especially a thin-film microbattery, and a method for making same having application as a backup or primary integrated power source for electronic devices.

J. B. Bates, N. J. Dudney, and K. A. Weatherspoon, U.S. Pat. No. 5,561,004 (Oct. 1, 1996): "Packaging Material for Thin-Film Lithium Batteries". This publication describes a thin film battery including components which are capable of reacting upon exposure to air and water vapor and which incorporates a packaging system which provides a barrier against the penetration of air and water vapour.

J. B. Bates and N. J. Dudney, U.S. Pat. No. 5,567,210 (Oct. 22, 1996): "Method for Making an Electrochemical Cell". This publication describes is a thin-film battery, especially a thin-film microbattery, and a method for making same having application as a backup or primary integrated power source for electronic devices.

J. B. Bates, U.S. Pat. No. 5,569,520 (Oct. 29, 1996): "Rechargeable Lithium Battery for Use in Applications Requiring a Low to High Power Output". This publication describes a rechargeable lithium battery which employ characteristics of thin-film batteries and can be used to satisfy power requirements within a relatively broad range.

J. B. Bates and N. J. Dudney, U.S. Pat. No. 5,597,660 (Jan. 28, 1997): "An Electrolyte for an Electrochemical Cell". In this publication a thin-film battery is a described. Especially a thin-film microbattery, and a method for making same having application as a backup or primary integrated power source for electronic devices.

Bates, John B.: United States Patent Application 20010014423:

"Fabrication of highly textured lithium cobalt oxide films by rapid thermal annealing" In this document systems and methods are described for fabrication of highly textured lithium cobalt oxide films by rapid thermal annealing.

Further the following U.S. Pat. Nos. 6,562,518; 6,555,270; and 6,344,366 concerns "Fabrication of highly textured lithium cobalt oxide films by rapid thermal annealing"

SUMMARY OF THE INVENTION

Utilizing the presented invention it will be possible to stuff—by curling, winding, etc.—a standard sized battery strip into any possible hearing aid shape and size.

The battery technology used in this invention is based on thin film technology. The battery consists of an active (core) layer with a typical thickness in the range of 10-20 µm per cell (cell stacking is also possible), which is deposited on a foil or a filament. On top of the active layer a passivation layer with a thickness in the range of 5-80 µm is deposited. The battery fabricated by such technology is totally self-contained, i.e. without the need for further packaging. Due to the small thickness of the thin film battery incredible flexibility can be obtained. The battery is either fabricated in a strip geometry having dimensions of e.g. 5 mm width or on metal filaments or metal coated filaments. The processing is done on endless lanes or on short pieces of the foil or filament.

According to the invention a rechargeable battery is provided comprising a flexible elongate electron conductive core surrounded by a first electrochemically active layer, and a second electrochemically active layer, separated by a separation layer and where an electron conducting element contacts the outer surface of the second electrochemically active layer, whereby at least one of the two electrochemically active layers and the separation layer are comprised of deposited thin-film layers.

In this way a thin elongate and flexible thread like battery is achieved, which is easily stored at any convenient space by folding or winding into a desired shape. As the elongate conductive core also functions as carrier, no carrier layer is needed and this will allow more volume efficient batteries to be made. More than one sequence of the mentioned layers may be deposited on top of each other, thus allowing stacking of the battery as is well known in the art.

In a further aspect of the invention at least part of the battery is wound to form an induction coil with a first and a second end.

Such and induction coil could be used for both charging purposes and for transmitting and or receiving antenna for communication purposes. The combined induction coil and rechargeable battery according to the invention is produced using thin film techniques for generating the active parts of the battery as this provides a battery with a very high efficiency and energy density. Other more conventional techniques for generating the rechargeable battery around a filament structure are available to provide a battery which may be wound to form an induction coil.

Preferably the electrochemically active layers comprise cathode and anode materials and the anode material comprise metallic lithium and the cathode material comprise lithium ions and the separation layer is a lithium ion conducting layer.

According to a further aspect of the invention a hearing aid is provided having a casing part enclosing electronic components for signal processing such as an amplifier wherein a battery is provided for delivering power to the signal processing device, whereby the battery comprise a layered structure provided on the surface of an elongate substrate having layers of anode- and cathode material and a ion conducting separation layer to separating the anode and cathode layer and current collecting layers whereby at least one of the layers is deposited in a thin film deposition process and whereby the battery is wound or curled up to accommodate an available space inside the casing.

By providing the battery in the shape of an elongate flexible structure with the very low thickness obtainable with the thin film processing it becomes possible to fold and/or wind the battery material to be accommodated inside the casing where it may fill out the available space between existing components. Especially when the hearing aid is an ITE wherein at least part of the casing is custom made, the shape and position of any space available for accommodating battery material cannot be predicted. The usual practice of providing space for a standard battery in many cases results in a larger than necessary hearing aid. The elongate flexible structure of the battery obtainable with the thin film processing could either be realised on a thread or filament structure whereby the layers are provided circumferentially on the surface of the thread, or the active layers of the battery may be provided on one or both surfaces of a flat film.

In an embodiment of the invention the hearing aid battery comprises an elongate thread like central element on the surface of which the battery is provided. Thereby the battery element may be curled/folded in any desired angle with respect to the longitudinal axis of the thread like central element, and this allows the element to be folded for accommodation of highly irregular space volumes. The thread like central element comprises an electrically conductive element which is provided as the one pole of the battery. If the battery is wound up as a coil the battery may then function as an induction antenna and is usable for receiving and or radiating energy. Thus the battery may function among other as a telecoil, a wireless radiating antenna or as a receiving element for wireless induction charging of the battery. Some of these possibilities may be realized with one and the same coil.

The invention further comprises a battery having a thread-like core part whereon layers of battery, barrier and protection materials are provided whereby the total diameter of the battery is preferably smaller than 100 µm.

BRIEF DESCRIPTION OF THE DRAWINGS

FIGS. 4a, 4b, 5a and 5b shows the battery wound op as a coil and the charging process.

DESCRIPTION OF A PREFERRED EMBODIMENT

Figure 1:
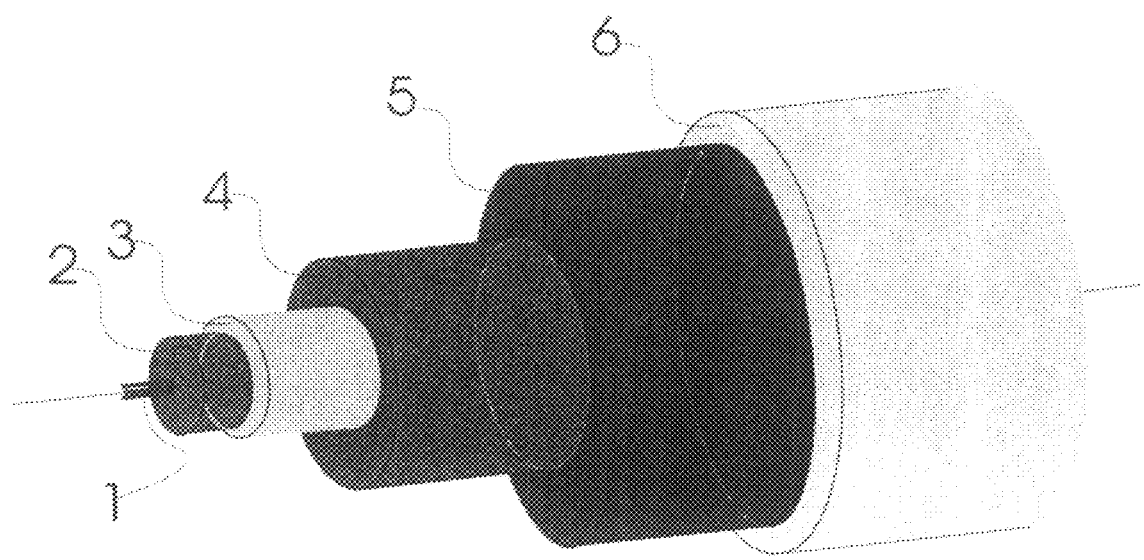
FIG. 1 is a schematic representation of a battery according to the invention.

The battery in FIG. 1 comprises a core part 1. Preferably the core 1 comprises one or several filaments of a conducting material. In a preferred embodiment the filaments are made of metal material. Other possibilities are metal coated filaments of eg. glass, polymer or carbon. This part of the battery is either anode or cathode current collector. In the following it is assumed that the filaments 1 functions as the cathode current collector. In a layer surrounding the filaments the cathode material 2 is provided. On top of the cathode an electrolyte material 3 is provided. The electrolyte covers the entire outer radial surface of the cathode material 2, and on top of the electrolyte layer the anode material 4 is supplied. The anode current collector 5 is the last active part of the battery and is provided on the anode material 4. The current collector 5 could be a metal layer which is provided on top of the anode 4, or metal filaments could be woven onto the anode 4. Also a combination of metal coating and filaments is possible. A protection layer 6 may be provided at last to secure the various parts of the battery against the detrimental effects of environmental elements such as oxygen or water. In an embodiment the anode current collector is also a protection layer such that the resulting battery filament becomes thinner.

The anode-, electrolyte- and cathode layers are applied as thin films in a vacuum or near vacuum process. The anode and cathode layers typically have a thickness of 10 to 15 µm. The electrolyte layer is usually thinner and in the range of 0.2 to 1 µm. The total thickness of the entire battery can then be as small as 50 µm. This would allow the thread which the battery forms to be wound up in coils. Such a coil, if formed without a hard core would be bendable to accommodate the irregular available space inside a custom made hearing aid for placement inside the ear canal of a user.

Figure 2:
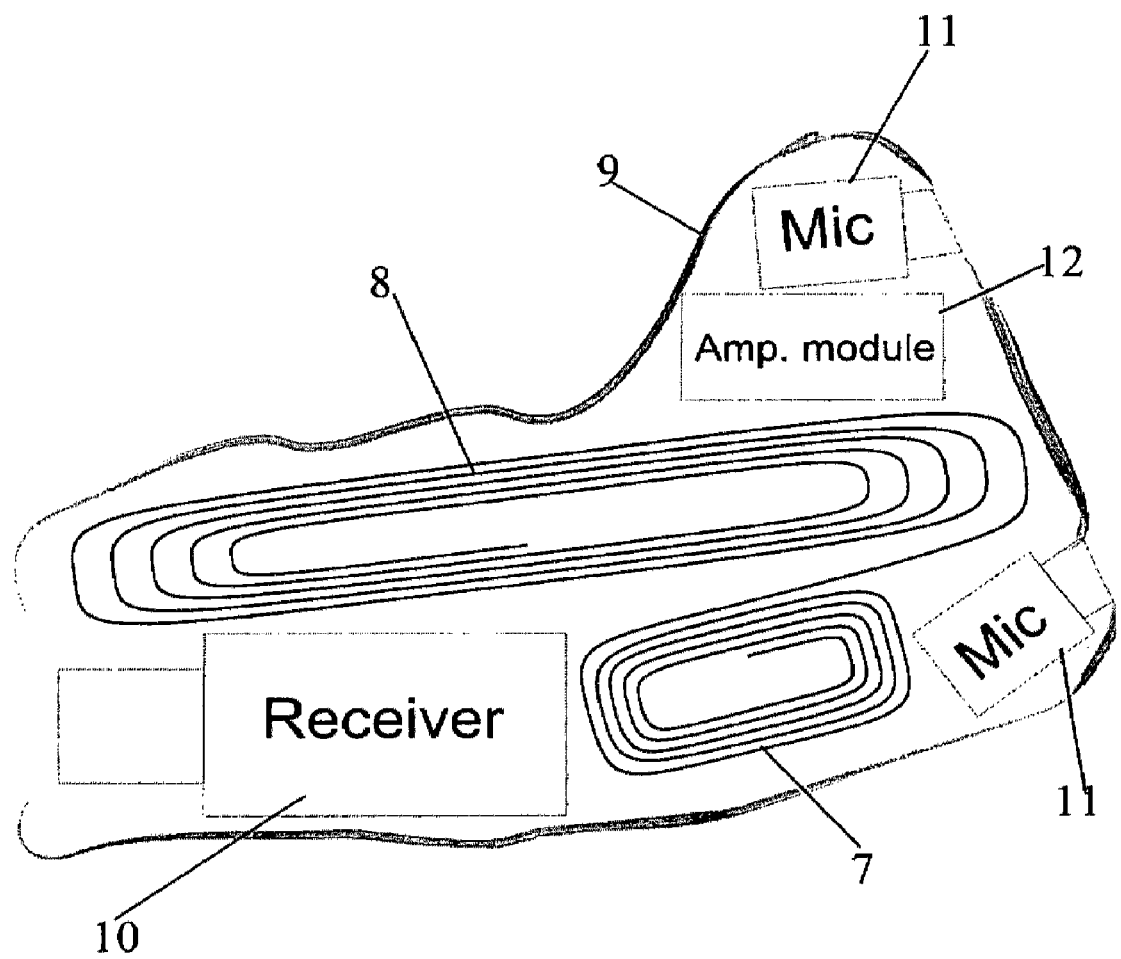
FIG. 2 shows a battery filament wound up and stuffed into a hearing aid.

The coils 7,8 in FIG. 2 are wound of a battery as disclosed above. When the coils 7,8 are subject to a changing magnetic field, voltage differences between the two ends of the coils 7,8 will be generated. This can be measured for communication purposes. Also inductive power may be radiated from the coil, if an electric current is sent through the windings of the coils. In both cases the currents run in anode and cathode collector elements alike, and this does not have any impact on the battery function of the coil.

The battery function is realized through a potential between anode and cathode when the battery is charged. When the battery is to be charged by the coil which it forms, it is subject to a changing magnetic field, and the resulting alternating voltage produced in the anode and/or cathode current collectors is transformed into a DC voltage potential and presented as a voltage difference between the cathode and the anode current collectors.

The coils 7,8 in FIG. 2 could also be wound from a battery strip material. When placed in an ITE hearing aid shell this offers improved exploitation of the free volume inside the shell. The larger coil 8 can—by means of further deformation—be stuffed far into the shell and placed next to the receiver 10, and the smaller coil 7 can be placed on top of the receiver 10 next to the amplifier module 12.

Figure 3:
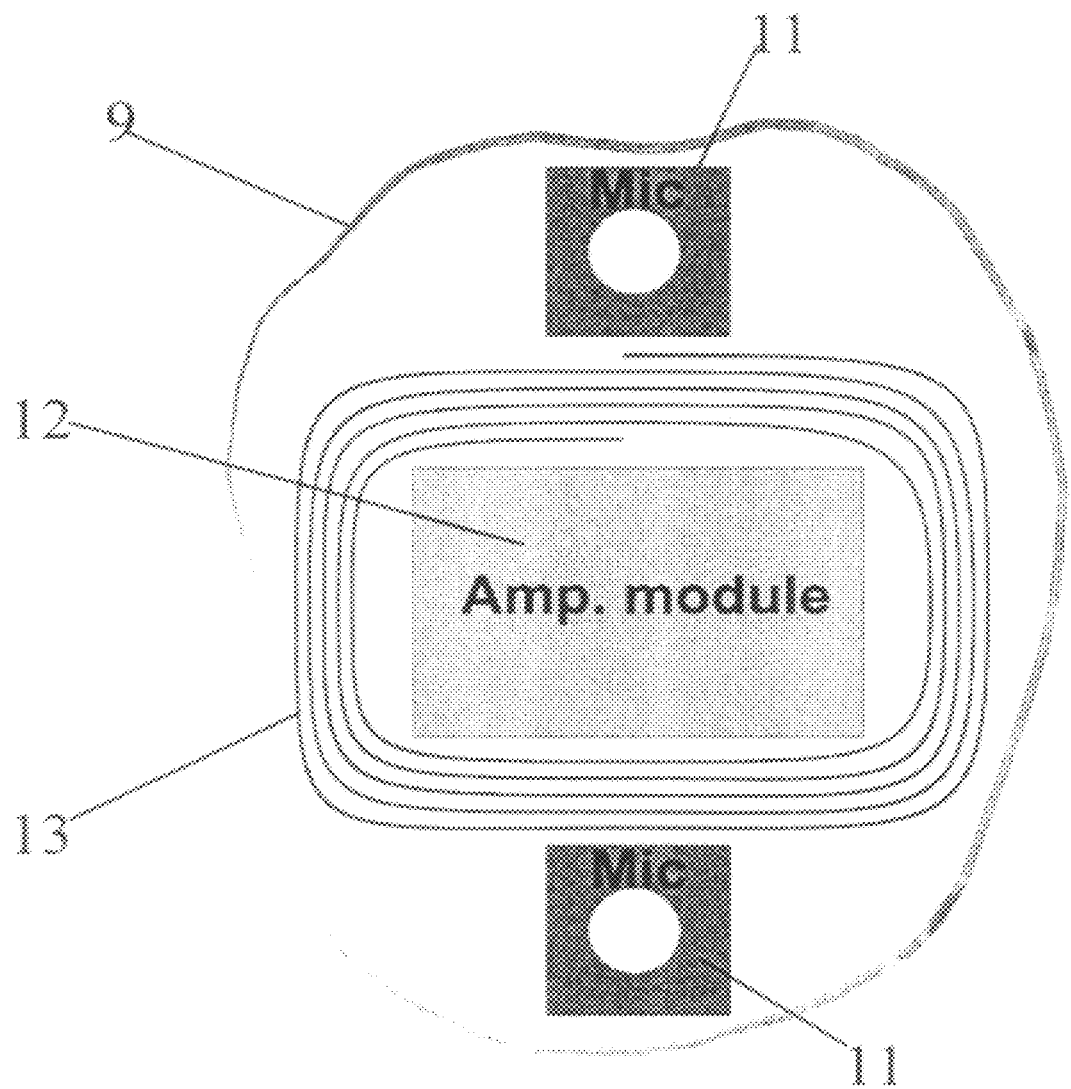
FIG. 3 shows another example of a filament battery in a hearing aid.

In FIG. 3 a further example of a strip like battery 13 which is stuffed into a hearing aid shell 9 is shown. The battery 13 is wound such that the amplifier module 12 can be placed inside the coiled battery 13. This optimizes the use of the free volume inside the shell 9 and in addition provides improved light and EMC protection for the hearing aid electronics.

In a method for producing the battery according to the invention a filament is continuously fed into a vacuum chamber and the different layers of the battery are applied by feeding the filament through different treatment regions. At last the filament is fed out of the vacuum for possible final treatment with a protection layer. In this way, continuos lanes of battery sheets or filaments may be generated at a fast rate.

In an embodiment the chemistry comprise the following elements: as electrolyte Lithium Phosphorus Oxynitride (LiPON) is used, as cathode material $LiCoO_2$ is used, and the anode is Lithium.

In FIGS. 4 and 5 the charging circuit of a battery according to the invention is disclosed. The battery coil 20 is placed in an alternating induction or magnetic field. This will generate an alternating voltage $V_L$ at the two ends of the coil 20. The alternating voltage is illustrated in FIG. 4a. In the first half of a cycle, the voltage will be positive (the gray area in FIG. 4a) and a positive voltage will build up at one end of the battery coil 20. At the two poles of the battery two diodes $D_1$ and $D_2$ are arranged. $D_1$ is placed at the positive pole and $D_2$ is placed at the negative pole. The output end of $D_2$ is connected to a capacitor $C_1$ and the capacitor is connected to the battery negative pole, but at the minus end of the coil. When the positive voltage builds up during the first half of the induction cycle, $D_2$ allows the charge to build up on $C_1$. During the second half of the induction cycle illustrated at FIG. 5a and FIG. 5b, the charge stored on $C_1$ will run through $D_1$, due to a negative potential being established at the battery poles connected to the diodes $D_1$ and $D_2$. During consecutive cycles of the alternating induction, charge is moved from one to the other of the two battery poles, and a charging of the battery is taking place.

The invention claimed is:

1. Rechargeable threadlike battery, comprising:
    a flexible elongate electron conductive thread or filament core surrounded by a first electrochemically active layer, and a second electrochemically active layer, separated by a separation layer, wherein
    an electron conducting element contacts the outer surface of the second electrochemically active layer,
    at least one of the two electrochemically active layers and the separation layer are comprised of thin-film layers,
    the layers are provided circumferentially on the surface of the thread or filament core, to provide an elongate and flexible, threadlike battery,
    at least part of the battery is wound to form an induction coil with a first end and a second end, and
    the negative and positive poles of the battery at first ends of the coil are connected to rectifiers.

2. Rechargeable battery as claimed in claim 1, wherein the electrochemically active layers comprise cathode and anode materials and where the anode material comprise metallic lithium and the cathode material comprise lithium ions and whereby the separation layer is a lithium ion conducting layer.

3. Rechargeable battery according to claim 2, wherein the lithium ion conducting layer is a ceramic layer.

4. Rechargeable battery as claimed in claim 1, wherein the rectifiers are connected to a capacitor, and where the capacitor is connected to the negative battery pole of the second end of the coil.

5. Rechargeable battery as claimed in claim 1, wherein the total diameter of the battery is smaller than 100 µm.

6. Rechargeable battery as claimed in claim 1, wherein the first electrochemically active layer, the separation layer and the second electrochemically active layer are applied as thin films in a vacuum or near vacuum process.

7. Rechargeable battery as claimed in claim 6, wherein the first electrochemically active layer and the second electrochemically active layer each have a thickness in the range from 10 µm to 15 µm.

8. Rechargeable battery as claimed in claim 6, wherein the total thickness of the separation layer in the form of an electrolyte layer is in the range from 0.2 µm to 1 µm.

9. Rechargeable battery as claimed in claim 8, wherein the total thickness of the battery is 50 µm.

10. Hearing aid comprising a rechargeable battery as claimed in claim 1.

11. Audio device, comprising:
    a receiver capable of delivering a signal to a user perceivable as sound;
    a shell or casing containing a microphone, a signal processing device, and a battery provided for delivering power to the signal processing device, wherein
    the battery includes a layered structure provided on a surface of an elongate substrate having layers of anode material and cathode material and a ion conducting separation layer separating the anode material layer and cathode material layer and current collecting layers,
    at least one of the layers is deposited in a thin film deposition process,
    the battery is wound, curled or crammed to accommodate an available space inside the casing,
    the separation layer is a lithium ion conducting layer,
    the lithium ion conducting layer of the battery is a ceramic layer,
    at least a part of the battery is wound up in a coil like structure with a first end and a second end, such that the current collecting layers form an induction coil, and
    the negative and positive poles of the battery at the first ends of the coil are connected to rectifiers.

12. Audio device as claimed in claim 11, wherein the casing is custom made to fit the inside of the ear or ear canal of an individual.

13. Audio device as claimed in claim 11, wherein the anode material includes metallic lithium, and the cathode material includes lithium ions.

14. Audio device as claimed in claim 11, wherein the rectifiers are connected to a capacitor, and where the capacitor is connected to the negative battery pole of the second end of the coil.

* * * * *